United States Patent
Veron

(10) Patent No.: US 8,130,895 B2
(45) Date of Patent: Mar. 6, 2012

(54) METHOD AND A DEVICE FOR PACKAGING LEAKY NUCLEAR FUEL RODS FOR THE PURPOSES OF TRANSPORT AND LONG-DURATION STORAGE OR WAREHOUSING

(75) Inventor: Jean-Luc Veron, Caluire (FR)

(73) Assignee: Areva NP, Courbevoie (FR)

( * ) Notice: Subject to any disclaimer, the term of this patent is extended or adjusted under 35 U.S.C. 154(b) by 143 days.

(21) Appl. No.: 10/574,057

(22) PCT Filed: Sep. 22, 2004

(86) PCT No.: PCT/FR2004/002389
§ 371 (c)(1),
(2), (4) Date: Mar. 29, 2006

(87) PCT Pub. No.: WO2005/034217
PCT Pub. Date: Apr. 14, 2005

(65) Prior Publication Data
US 2007/0104305 A1    May 10, 2007

(30) Foreign Application Priority Data
Oct. 1, 2003  (FR) ...................................... 03 11510

(51) Int. Cl.
*G21C 1/06*   (2006.01)

(52) U.S. Cl. ....................... 376/272; 250/507.1; 376/261

(58) Field of Classification Search .................. 376/261, 376/272; 250/507.1
See application file for complete search history.

(56) References Cited

U.S. PATENT DOCUMENTS

| 3,216,174 A | | 11/1965 | Hedgecock | |
|---|---|---|---|---|
| 4,659,536 A | * | 4/1987 | Baudro | 376/261 |
| 4,731,219 A | * | 3/1988 | Beneck et al. | 376/261 |
| 4,780,269 A | * | 10/1988 | Fischer et al. | 376/272 |
| 4,889,680 A | * | 12/1989 | Wachter | 376/261 |
| 5,009,835 A | * | 4/1991 | Ahmed | 376/251 |
| 5,361,281 A | * | 11/1994 | Porowski | 376/272 |

FOREIGN PATENT DOCUMENTS

| DE | 196 40 393 | | 4/1998 |
|---|---|---|---|
| EP | 147183 | | 7/1985 |
| EP | 218054 | | 4/1987 |
| EP | 1248270 | | 10/2002 |
| FR | 2530366 | | 1/1984 |
| JP | 2000-111682 A | * | 4/2000 |
| WO | WO-03065380 A1 | * | 8/2003 |
| WO | WO-2004-051671 A1 | * | 6/2004 |

OTHER PUBLICATIONS

English translation of Kraus et al., "Capsule, Nuclear Reactor Fuel Element with a Capsule, and Method for Producing a Capsule", of Krasu DE 196 40 393 A1 as cited in the office action (made available earlier to applicant).*

\* cited by examiner

*Primary Examiner* — Johannes P Mondt
(74) *Attorney, Agent, or Firm* — Davidson, Davidson & Kappel, LLC

(57) ABSTRACT

A plurality of capsules are made available, each for receiving a fuel rod, and each comprising a tubular sheath that is closed at its ends by plugs. A loading structure is placed in a pool to receive at least one capsule with its axis vertical. A device for loading fuel rods into the capsule is secured onto an open top end of the structure. Defective rods are taken one by one and inserted one by one into empty capsules in the loading structure. For each capsule that is to receive a defective rod, a top plug of the capsule is unscrewed, a defective rod is inserted into the capsule through a guide device of the loading device, the top plug is screwed back onto the capsule, and the capsule containing the rod is put into a location in the support structure.

6 Claims, 6 Drawing Sheets

METHOD AND A DEVICE FOR PACKAGING LEAKY NUCLEAR FUEL RODS FOR THE PURPOSES OF TRANSPORT AND LONG-DURATION STORAGE OR WAREHOUSING

FIELD OF THE INVENTION

The invention relates to a method and a device for packaging leaky fuel rods for the purpose of transport and of long-duration storage or warehousing.

BACKGROUND INFORMATION

In water-cooled nuclear reactors, and in particular in nuclear reactors cooled by pressurized water, fuel assemblies are used that comprise a frame having fuel rods placed therein, each fuel rod being constituted by tubular cladding filled with fuel pellets, e.g. pellets of uranium oxide $UO_2$, and closed at its ends by sealed plugs.

The cladding and the plugs of rods are generally made of zirconium alloy, and the cladding is filled with helium under pressure prior to the rods being sealed in completely leaktight manner.

Inside a nuclear reactor in operation, the cladding of the rods is subjected to mechanical stresses and the cladding can suffer corrosion, such that it is possible for cracks to appear that pass through the cladding in some of the rods in a fuel assembly. The rod is then no longer sealed, and the helium that was contained in the cladding together with the fission gases given off by the fuel can leak out through the cladding, thereby causing radioactive substances to be disseminated into the environment of the fuel assembly.

While the nuclear reactor is shut down, e.g. for reloading or for maintenance and repair, at least some of the fuel assemblies are unloaded from the core, these fuel assemblies being placed in a fuel pool within which certain repair and reconditioning operations are performed on used fuel assemblies.

In particular, during these repair and reconditioning operations on fuel assemblies, leaky fuel rods are taken from the fuel assemblies, with these leaky rods being stored, for example, in temporary manner in a storage structure within the fuel pool.

In theory, the fuel contained in the rods can be recovered in fuel reprocessing facilities in which the fuel material is separated from the worn and cracked cladding and is processed as radioactive waste. Nevertheless, for several years, the regulations in force have tended to ban the transport between power plants and reprocessing facilities of fuel rods that might lead to radioactive materials being disseminated.

It is therefore necessary to provide methods and devices that enable leaky fuel rods to be stored for long durations without involving transport operations between nuclear reactors and reprocessing facilities, or in some circumstances the transport of leaky rods in sealed sheaths.

Proposals have been made in particular to use capsules each comprising a tubular sheath suitable for containing a fuel rod and closed at its ends by plugs that can be secured in leaktight manner to the end portions of the capsule sheath. The plugs secured to the two ends of the capsule also include respective valves in respective channels passing through the plugs, thus enabling a leaky rod that is generally full of water inside the pool to be purged and enabling the inside volume of the capsule to be filled with an inert gas under pressure. After the plugs have been closed in leaktight manner at the ends of the capsules, the leaky rod is confined so that it is no longer in danger of disseminating radioactive substances into the surroundings. The capsules are designed to be suitable for being inserted in support structures. These support structures in which leaky rods have been encapsulated can themselves be transported to a storage site, a reprocessing facility, or a hot laboratory for examination or investigation.

Devices are also known for transporting irradiated fuel material and comprising cases inside a transport container that is fitted with a means for closing the ends of the container, with damper means, and with grip means enabling it to be handled, the cases being of square-section of tubular shape suitable for being closed in leaktight manner by end walls or covers that are welded to the ends of the cases, and in which irradiated fuel materials are placed.

When it is desired to perform long-duration storage or very long-duration warehousing of leaky fuel rods stored in a pool, known encapsulating or transport devices do not make it possible in simple and practical manner to package large quantities of leaky fuel rods.

The term "warehousing" of nuclear materials is used to mean storage that enables the materials to be recovered at any time. Such very long-duration warehousing may be intended to last, for example, for a duration of 300 years or more. Long-duration storage may be intended to last, for example, for a duration of 50 years to 100 years.

During continuous operation of a nuclear reactor, it can become necessary, after the reactor has been operating for a certain length of time, to dispose of a large number of leaky rods that have been removed from fuel assemblies during successive campaigns of nuclear reactor maintenance and reloading.

SUMMARY

The objective of the invention is to thus provide a method of packaging leaky fuel rods for the purposes of long or very long-duration storage or warehousing, each of the leaky fuel rods comprising pellets of fuel material in tubular cladding closed at its ends and presenting a leak, and the leaky fuel rods being placed initially underwater in a pool so that the leaky rods can be warehoused subsequently over a period of very long duration (greater than 300 years) or stored over a period of long duration (e.g. 50 years to 100 years) in a suitable installation.

For this purpose, the invention provides:
  making available a plurality of capsules each for receiving a fuel rod and comprising a tubular sheath with two closure plugs at its ends, at least one of which is removable;
  placing a loading structure in the pool, in a disposition enabling it to receive at least one capsule of the plurality of capsules with its axis vertical;
  securing a device for loading fuel rods in the capsule on an open top end of the loading structure;
  taking leaky rods one by one from an intermediate storage arrangement in which leaky rods coming from at least one fuel assembly are placed, and inserting one by one, capsules not containing rods in the vertical position in the loading structure, in a loading location vertically in register with an opening of the loading device; and
  for each of the capsules that is to receive a corresponding leaky rod:
  unscrewing the removable plug of the capsule situated at the top thereof;
  inserting a defective rod in the capsule through a guide device placed at the opening in the loading device;
  screwing the top plug back onto the capsule;

placing the capsule containing the defective rod in a location of the support structure; and transporting and storing the defective rods inside capsules placed in the support structure.

The invention also provides a packaging device for implementing the method of the invention and comprising:

a loading structure for loading defective rods into capsules, the structure including a loading location for loading each capsule with a defective rod, and a filling location for filling each capsule with inert gas;

a guide and holder device comprising an arrangement for positioning it on the loading structure;

a support structure for supporting capsules for long-duration storage or very long-duration warehousing; and a tool for handling and filling capsules.

In embodiments that can be taken singly or in combination:

the loading structure comprises a frame for receiving the capsules, the frame comprising a handling top nozzle and a bottom nozzle both extending transversely and assembled together by longitudinally-extending tie-bars, and a plurality of transversely-extending spacer plates distributed along the longitudinal direction of the loading structure, each comprising an array of openings, each serving to pass and hold one capsule, some of which have the assembly tie-bars of the frame of the loading structure engaged therein, the structure having a first location for loading capsules in the vicinity of one of the corners of the square-shaped cross-sections of the loading structure;

the loading structure further comprises a second location in which the bottom nozzle of the loading structure has an opening for receiving a plug for closing the bottom end of a capsule, in which opening there is placed a peg projecting into the loading structure, and the bottom and top plugs of the capsules have respective axial through channels containing respective channel-closure valves urged into a closed position by respective helical springs, the open end of the channel in the top plug including an arrangement for connection to an inert gas feed duct, and after a defective rod has been inserted into a capsule and the top plug of the capsule has been screwed back into place while the capsule is in the loading, first location, the capsule is transferred to the second location for filling with inert gas, the bottom plug of the capsule is inserted into the corresponding housing of the bottom nozzle, so that the projecting peg lifts the valve of the bottom plug into an open position, and an inert gas such as argon is delivered under pressure into the inlet end portion of the channel of the top plug so as to open the valve in the top plug and then fill the inside space of the capsule with inert gas, the water or the gas contained in the capsule being expelled through the channel in the bottom plug, inert gas delivery being interrupted after the inside space of the capsule has been filled, so that the valve for closing the top plug recloses, the defective rod then being stored inside the capsule in an atmosphere of inert gas under pressure;

the capsule support structure in which capsules containing defective rods are transported and stored over long duration is constituted by the loading structure itself;

the capsule support structure containing defective fuel rods is constituted by a transport and/or storage container including at least one location for receiving at least one of a loading structure and a capsule;

the support structure constitutes a warehousing arrangement containing at least one case having substantially the shape and the dimensions of a fuel assembly for receiving a plurality of capsules and closable by an arrangement of sealed covers;

a sealed barrier is constituted around each of the defective rods by at least one of the capsule containing the rod and a case containing the capsule; and the warehousing arrangement is made to receive at least one loading structure in the place of a case.

The invention also provides a device for implementing the method with the capsules being filled with inert gas, the device being characterized by the facts that:

the loading structure presents the shape and the dimensions of a fuel assembly and comprises a top nozzle and a bottom nozzle that are assembled together by tie-bars extending longitudinally relative to the nozzles which extend transversely, a plurality of spacer plates in transverse dispositions distributed in the longitudinal direction of the loading structure, and an actuator peg for actuating a valve disposed in a through channel passing through a bottom plug in each capsule (8), in the filling location;

the loading device comprising a centering plate provided with an arrangement for positioning it on the loading structure, first and second through openings in the centering plate, and a clamping arrangement for clamping a capsule inserted into the loading structure in the loading location, together with a guide bell suitable for being placed on the centering plate at the first opening; and the tool for handling and filling capsules comprises an outer tube shaped to be engaged on a shaped top plug of a capsule and to be constrained in rotation with the top plug that can be screwed on and off a body of the capsule, and an inner tube for feeding gas that is suitable for connection to a channel passing through the top plug of each capsule.

In particular:

the loading structure may include a plurality of locations for storing capsules and may constitute the capsule support structure.

BRIEF DESCRIPTION OF THE DRAWINGS

In order to make the invention well understood, there follows a description by way of example and with reference to the accompanying figures of an implementation of the packaging method of the invention and of the device for implementing it, in the context of storing leaky fuel rods for fuel assemblies of a pressurized water nuclear reactor.

DETAILED DESCRIPTION

Figure 1:
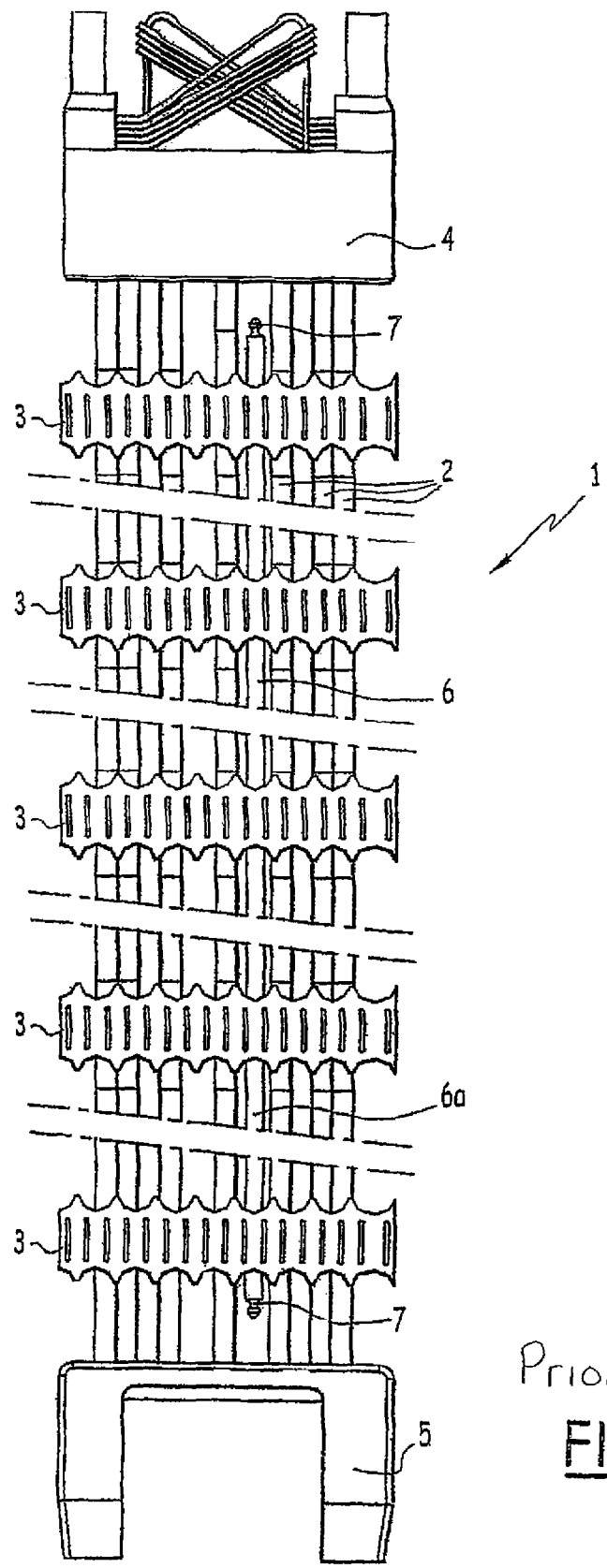
FIG. 1 is a diagrammatic elevation view of a fuel assembly for a pressurized water nuclear reactor.

FIG. 1 shows the skeleton of a fuel assembly for a pressurized water nuclear reactor, the assembly being given overall reference 1.

The skeleton of the fuel assembly 1 comprises in particular longitudinally-extending guide tubes 2 and spacer grids 3, each defining an array of cells for receiving the fuel rods, some of the cells being provided for passing the guide tubes 2 inside the spacer grids 3 that are distributed along the length of the tubes 2.

In addition, at one if its ends, the skeleton includes a top nozzle 4, and at its other end, a bottom nozzle 5, with at least one of the end nozzles 4 and 5 serving to close the fuel assembly and being secured releasably to the ends of the tubes 2.

Inside the skeleton of the fuel assembly 1, only one fuel rod 6 is shown for greater clarity, said rod presenting a length that is shorter than the length of the guide tubes 2 and being engaged in aligned cells of successive spacer grids 3.

The fuel rod 6 comprises tubular cladding 6a, generally made of zirconium alloy, containing a column of fuel pellets stacked in the axial direction of the rod and closed at its ends by sealed closure plugs 7. The plugs 7 of the fuel rod 6 present a profile shaped so as to enable them to be gripped by the clamp of a tool for handling the fuel rods or for installing plugs at the axial ends of the cladding 6a.

After the cladding closed at one of its ends by a plug has been filled with fuel pellets, the second plug is put into place and the air contained in the cladding is pumped out with the inside of the cladding being filled with helium under pressure.

After being used for a certain length of time in the core of the nuclear reactor, certain fuel assemblies of the core can present rods in which the cladding has become cracked, such that the cladding is no longer sealed. Under such circumstances, the helium with which it was filled can escape from the cladding, entraining fission products into the primary circuit of the nuclear reactor.

During a period of reloading the nuclear reactor, fuel assemblies are inspected, generally in the fuel pool of the nuclear plant, in order to determine whether any leaky rods, also known as "defective rods" are present in the fuel assemblies.

Figure 7:
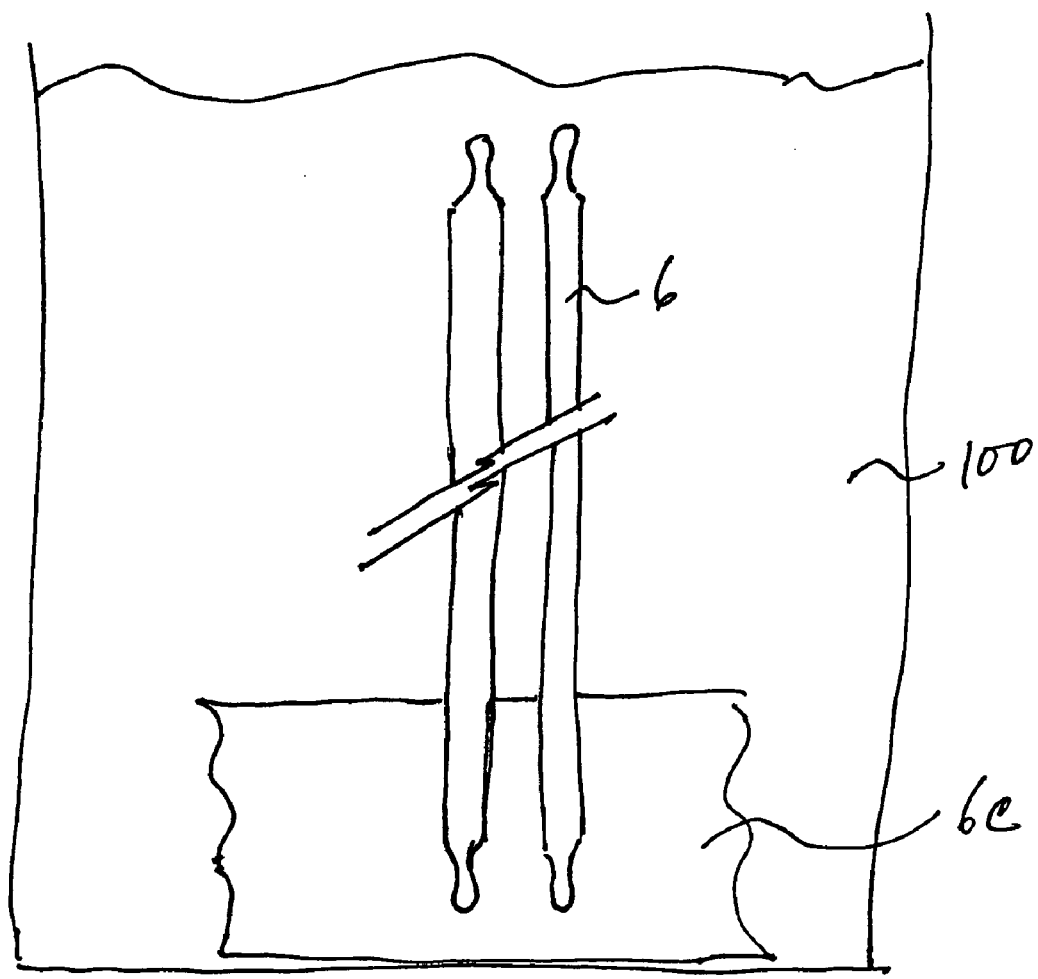
FIG. 7 is a view of the pool and intermediate structure.

The leaky rods 6 may be removed from the fuel assemblies after their top or bottom nozzles have been removed depending on the method used, and then optionally stored in a receiver arrangement such as a rod holder in the fuel pool 100, the rod holder defining an intermediate storage arrangement 6c as shown in FIG. 7. It is also possible to place the fuel assemblies having one or more leaky rods in cells of fuel assembly racks inside the fuel pool.

In order to implement the method of the invention, the leaky rods are inserted into capsules which are subsequently closed by plugs in sealed manner and their ends.

Figure 2:
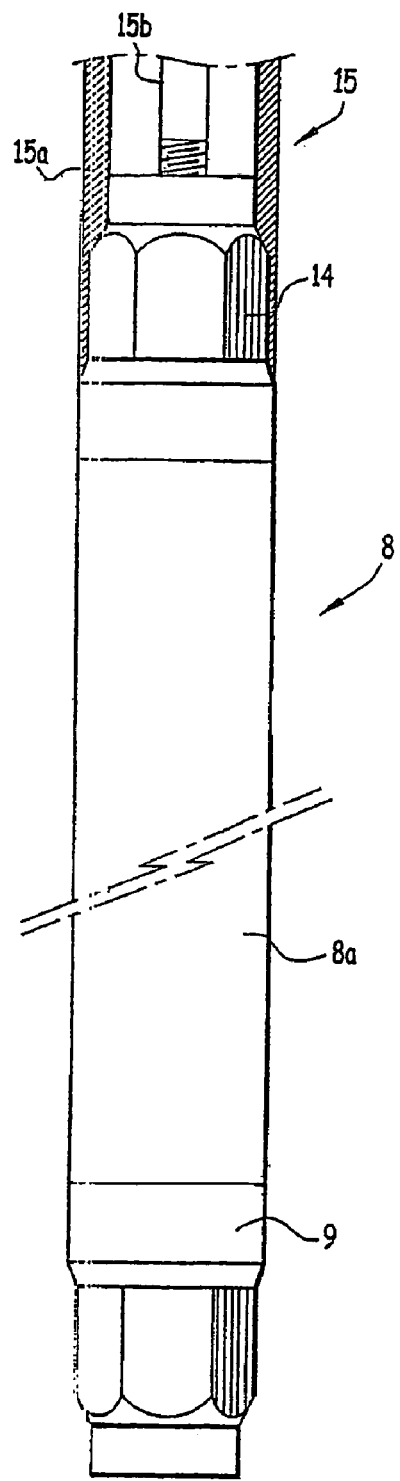
FIG. 2 is a fragmentary elevation view of a capsule for receiving a leaky rod of the fuel assembly.
Figure 3:
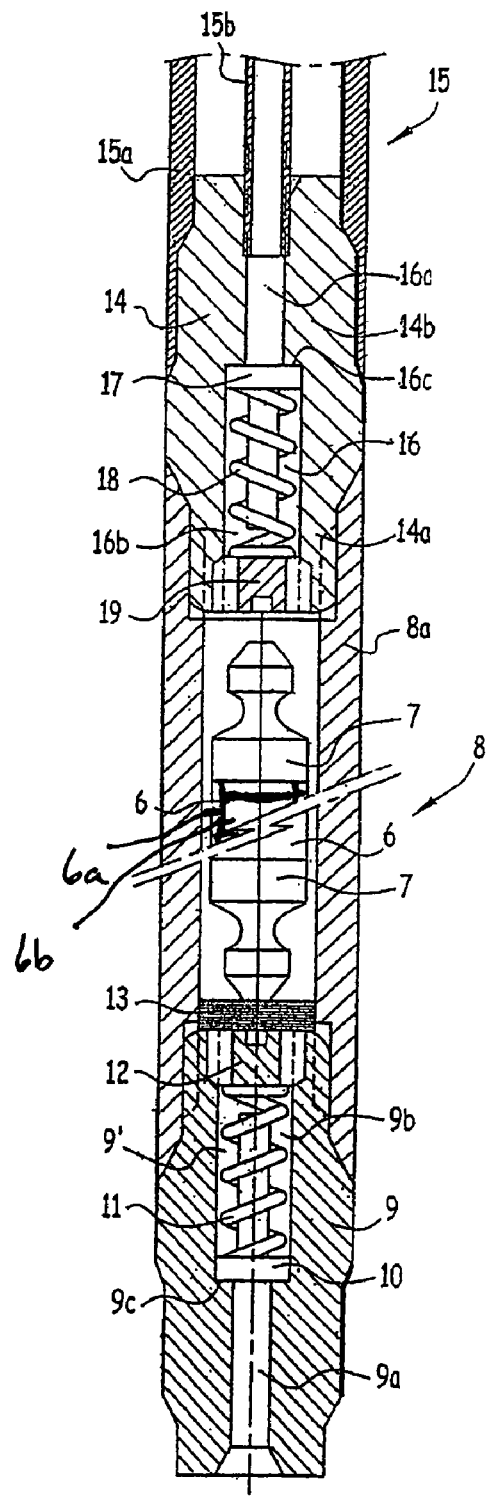
FIG. 3 is an axial section view of the capsule shown in FIG. 2.

FIGS. 2 and 3 show a capsule 8 for containing a leaky fuel rod. The capsule 8 comprises a tubular body 8a of generally circular section having an inside diameter that is greater than the diameter of the cladding 6a and the plugs 7 of a fuel rod. The tubular body 8a of the capsule is of a length that is longer than a fuel rod, said length being close to 5 meters (m), for example.

The tubular cladding 8a of the capsule 8 is closed at its bottom end by a bottom plug 9 which may be fitted thereto and secured by being welded to the bottom end of the cladding 8.

The bottom plug 9 has a channel passing therethrough along its axis comprising a bottom end portion 9a opening out into the bottom end of the capsule 8, and a top portion 9b of diameter greater than the end portion 9a and defining a seat 9c for a closure valve 10 for closing the channel that passes axially through the bottom plug of the capsule. The shutter member of the valve 10 is urged towards its closed position against the seat 9c by a helical spring 11 interposed between an abutment part 12 screwed into a portion of the channel 9' that opens into the tubular body of the capsule, and a bearing portion of the shutter member of the valve 10. The bearing part 12 has axial openings for passing fluid and serves to secure and support a filter element 13 for filtering a fluid that is caused to flow through the channel 9' at the bottom end portion of the capsule 8 when the valve 10 is open.

A second plug or top plug 14 serves to close the top end of the cladding 8a of the capsule 8 in releasable manner. In FIG. 2, there can be seen the top closure plug 14 of the capsule which is inserted inside a tool 15 for screw-driving and for delivering gas under pressure into the capsule.

FIG. 3 illustrates the plug 14 in a closed position at the top end of the capsule, after a fuel rod 6 with end plugs 7, cladding 6a and pellets 6b has been inserted inside the capsule.

The plug 14 has a threaded portion 14a for inserting and screwing into a tapped opening at the top end of the cladding 8a of the capsule 8. The screwed-in plug bears in sealed manner against a bearing surface at the axial end of the body 8a of the capsule 8. The plug 14 has an end portion 14b remote from its threaded portion 14a and that presents a shaped profile, e.g. of hexagonal section, enabling the plug 14 and an outer tube 15a of the tool 15 to be constrained to rotate together so as to enable the plug to be screw-tightened or loosened.

The plug 14 has a channel 16 passing along its entire axial length, the channel 16 having an end portion 16a opening out into the top end of the capsule, and a portion 16b of diameter greater than that of the portion 16a and opening out into the end of the plug 14 that is to be inserted into the cladding 8a of the capsule. Between the first portion 16a of the channel 16 and the second portion 16b of greater diameter, there is provided a seat 16c against which a shutter member of a valve 17 for closing the channel 16 can come to bear, the shutter member being urged towards its closed position by a helical spring 18 interposed between an abutment element 19 screwed into the open end portion of the portion 16b of the channel 16 and an abutment shoulder of the shutter member of the valve 17.

The screwed-in abutment element 19 includes axial passages for passing a fluid. The first portion 16a of the channel 16 opening out into the top end of the capsule includes tapping for securing a tube 15b for delivering gas that is secured coaxially inside the shaped outer tube of the tool 15 that is used for screw tightening and loosening the top plugs of the capsules.

Figure 4:
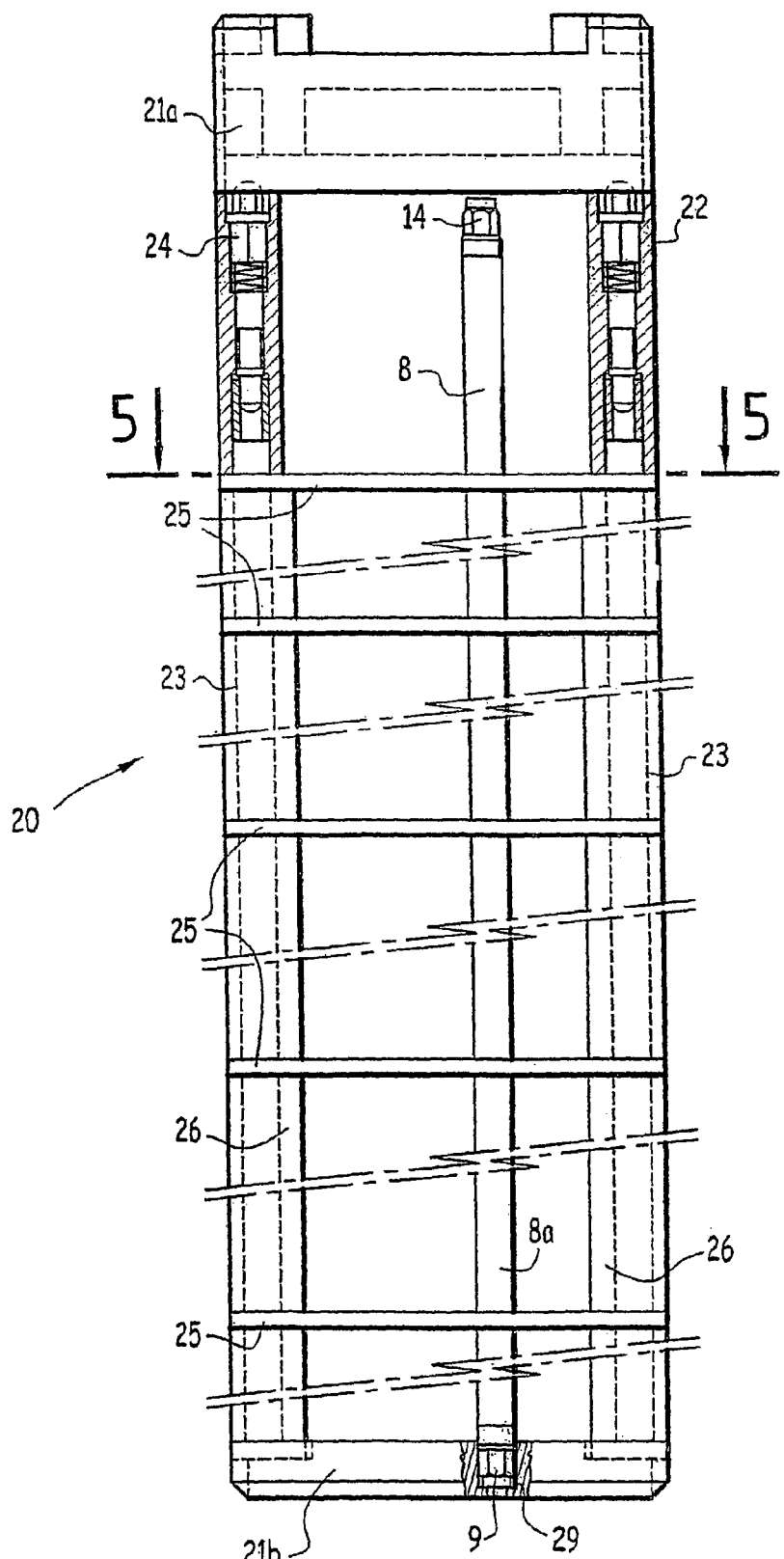
FIG. 4 is an elevation view of a capsule-support structure in the form of a rod holder.

FIG. 4 illustrates a structure 20 constituting both a loading structure and a support structure for capsules 8 and suitable for use firstly for filling the capsules with leaky rods, and secondly for storing capsules that contain leaky rods.

The capsule support structure 20 or "quiver" presents the shape and the dimensions of a pressurized water nuclear reactor fuel assembly, as shown in FIG. 1.

In particular, the support structure 20 has a top nozzle 21a and a bottom nozzle 21b of square section and of side substantially equal to the side of a square nozzle for a fuel assembly.

The top nozzle 21a has an arrangement for enabling the support structure 20 to be handled by handler devices analogous to those used for handling fuel assemblies in the fuel pool of the nuclear reactor. The top nozzle 21a also includes fastener sleeves 22 extending the nozzle axially downwards over a certain height. The sleeves 22 serve to assemble the top nozzle which is made to be removable with axially-extending tie-bars 23 that are disposed in two corners of the square section support structure. The tie-bars 23 and the sleeves 22 of the top nozzle 21a are assembled together by bolts 24 inserted into the sleeve 22 in the two corners of the structure lying on a diagonal of the square section of the structure 20. The bolts 24 can be screw-tightened or loosened from the top portion of the handling nozzle 21a so as to secure or release the nozzle 21a. The tie-bars 23 are secured at their bottom ends to the bottom nozzle 21b and provide a connection between the two nozzles suitable for transmitting forces when the support structure is loaded with capsules containing leaky rods. The support structure 20 also includes spacer plates 25 which are distributed along the length of the structure in the axial direction, and which include openings for passing the tie-bars that serve to assemble and stiffen the structure. Each of the spacer plates 25 is pierced by an array of openings each allowing a respective capsule 8 to pass therethrough, the spacer grids serving to hold the capsules 8 in an array disposition in planes extending across the structure, as shown in FIG. 5.

The support structure 20 may also have stiffening and assembly corner pieces 26 extending in the axial longitudinal direction and located at the four vertical edges. Nevertheless, in order to enable the structure to be taken apart and reprocessed, it is preferable to avoid using corner pieces and to stiffen the structure by an arrangement of tubes or tie-bars occupying the locations of certain capsules inside the structure.

Figure 5:
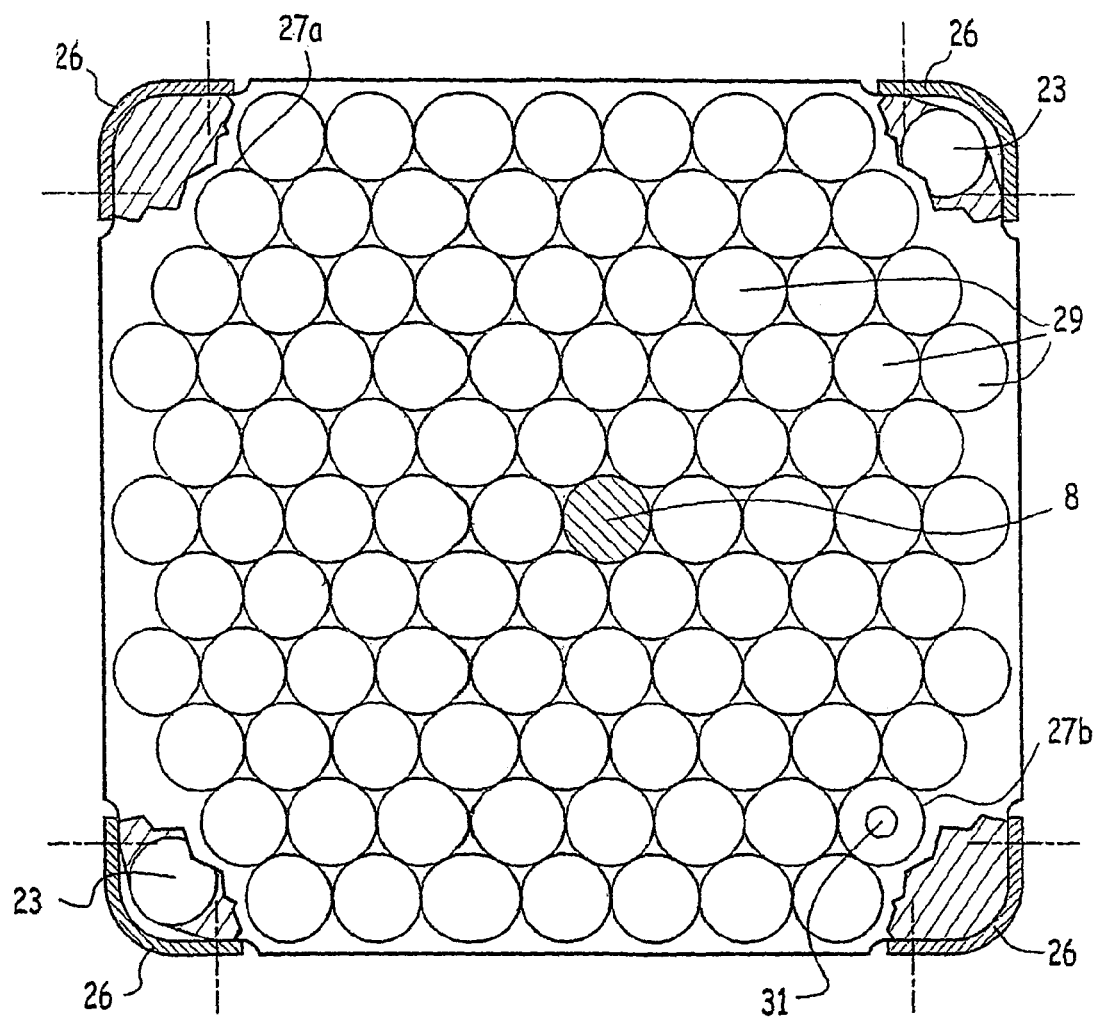
FIG. 5 is a cross-section view on 5-5 of FIG. 4.

The array of storage locations each having a capsule 8 located therein, as shown in FIG. 5, includes two special locations 27a and 27b serving firstly (27a) for filling the capsules 8 with leaky rods, and secondly (27b) for putting the inside of the capsules under the pressure of an inner gas.

The bottom nozzle 21b has housings 29 serving to receive respective bottom plugs 9 of the capsule 8, the housings 29 being disposed in an array corresponding to the array of through openings in the spacer plates 25.

In order to make the structure easier to reprocess, it is preferable not to embed the capsules 8 in the bottom nozzle 21b, so as to leave a suitable amount of axial clearance.

As provided in FIG. 5, at the location 27b, the bottom nozzle 21b includes a peg 31 in its housing 29 for receiving the bottom end of a capsule, the peg 31 projecting upwards and being suitable for actuating the valve 10 of the bottom plug 9 in a capsule inserted into the location 27b of the support structure so as to open the valve and allow the water contained in the capsule to escape and make it possible to fill the inside of the capsule 8 with inert gas.

Figure 6:
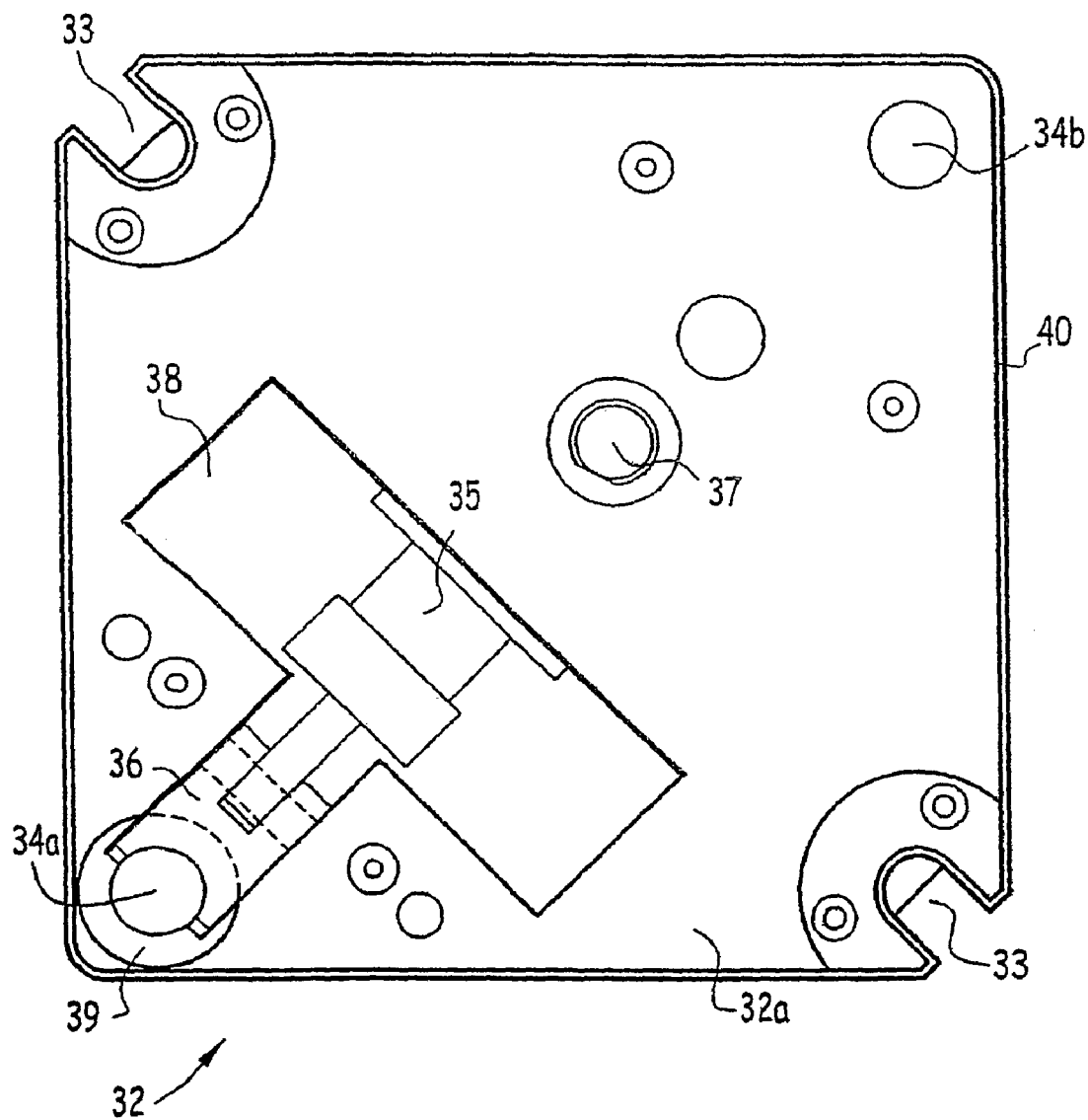
FIG. 6 is a plan view of a device for loading capsules with leaky fuel rods.

FIG. 6 shows a device for guiding and holding capsules given overall reference 32 and designed to be placed above the top portion of the support structure 20 after the top nozzle 21a has been removed.

The guide and holder device 32 comprises a square centering plate 32a of the same dimensions as the section of the support structure 20, and including two positioning openings 33 in two corners located on one of the diagonals of the plate 32a, which openings 33 are open to the outside and have guide parts mounted at their edges, which parts are secured to the centering plate 32a.

In addition, in two portions situated in corners of the plate 32a that lie on the other diagonal of the section, the centering plate 32a has two openings 34a and 34b passing therethrough enabling capsules to be passed respectively to the locations 27a and 27b when the guide and holder device 32 is engaged via its openings 33 on the centering arrangement of the support structure 20.

Under the plate 32a of the guide and holder device 32 there is a clamping actuator 35 having its rod directed along the second diagonal of the plate 32a and secured to a clamping shoe 36 directed towards the opening 34a in which a capsule 8 can be inserted. By actuating the actuator 35, the clamping shoe can be moved so as to engage the outside surface of the capsule and hold it, in particular against torque for tightening or loosening the top plug of the capsule.

The plate 32a also has a handling opening 37 close to its middle so as to enable the device 32 to be gripped for placing it on the support structure in the fuel pool.

The plate 32a also has an opening 38 enabling capsules to be inserted into locations other than the locations 27a and 27b.

An operation of packaging a leaky fuel rod in accordance with the invention is described below. Leaky defective rods are to be found in the fuel pool, either in fuel assemblies that are being repaired from which one of the nozzles has been removed so as to give access to the fuel rods, or else in an intermediate structure for receiving defective rods such as a holder having the shape of a fuel assembly.

The holder for defective rods or the assembly(ies) that contain defective rods are placed in a rack for storing fuel assemblies in the bottom of the pool. A first operation consists in transferring defective rods into a station for repairing leaky assemblies located close to the cab of the pool's fuel assembly elevator.

Thereafter, the capsule holder 20 constituting the capsule support structure is put into place in the elevator serving the fuel pool, and the top handling nozzle 21a is removed from the capsule holder 20.

The guide and holder device 32 is put into place on the capsule support structure 20. An empty capsule is taken by the capsule handling tool 15 whose shaped outer tube 15a is engaged on the shape portion of the top plug of the capsule, and whose inner tube is screwed into the tapped opening in the top plug of the capsule.

The capsules 8 for leaky rods are stored either at the side of the pool, or else in capsule holders 20 constituting the support structure.

The capsule gripped by the handling tool is inserted through the opening 34a of the guide and holder device 32 into the loading location 27a of the support structure 20. The capsule is held by actuating the actuator 35 of the guide and holder device 32, with the clamping shoe 36 then clamping the body of the capsule against an abutment part secured to the plate 32a of the device 32.

The top plug 14 is unscrewed from the capsule 8 using the capsule handling tool 15, with the plug 14 remaining secured to the handling tool 15 after it has been unscrewed.

A guide bell 39 is placed over the centering plate 32a of the device 32, the bell 39 having an upwardly-directed flared frustoconical portion.

The leaky rod is extracted from the fuel assembly repair station using a rod handling tool of the fuel pool.

The defective rod is inserted into the capsule 8 disposed in the location 27a via the bell 39 that serves to guide the leaky rod.

The centering plate 32 is surrounded by a raised edge constituting a protective frame 40 serving to retain on the plate any fuel pellets that might fall out while the fuel rod is being put into place in the capsule.

The device enables any defective rod to be encapsulated, even when the rod is highly damaged or broken.

The plug is tightened to a predetermined tightening torque, and then the clamping shoe 36 is loosened so as to release the capsule.

The capsule is transferred with the handling tool 15, firstly to above the location 27b of the support structure, and the capsule is then inserted into the location 27b through the opening 34b in the plate 32a.

When the bottom plug 9 of the capsule 8 reaches the opening 29 in the bottom nozzle 21b, the peg 31 actuates the valve 10 so as to open it, and thus open the inside space of the capsule to the pool.

An inert gas, e.g. argon or helium, is introduced under pressure into the inside space of the capsule, by feeding the inner tube 15b of the handling tool 15 with inert gas under pressure, thereby opening the valve 17 of the top plug 14 of the capsule. The inert gas under pressure expels the water located inside the capsule so as to return it to the fuel pool after passing through the filter 13.

Once the capsule has been filled completely with inert gas, the capsule is raised using the handling tool 15, thereby enabling the valve 10 in the bottom plug 9 to be reclosed.

The capsule 8 containing the leaky rod is then put into place in a storage location of the support structure 20.

Once the support structure 20 has been filled so that each of its locations contains a capsule enclosing a leaky rod, the top nozzle of the holder is put into place and the holder full of capsules is placed in the fuel assembly storage rack at the bottom of the pool.

It is possible subsequently to proceed with transport, storage, or warehousing operations.

Long-duration storage or very long-duration warehousing of leaky rods can be performed subsequently in a suitable installation.

The support structure containing the capsules with leaky rods can be transported to a site for long-duration storage or very long-duration warehousing where storage structures can be placed in reserved locations.

During transport, and during storage or warehousing, the capsule 8 constitutes a barrier for the fuel in addition to the primary barrier constituted by the cladding of the rod, which cladding is defective.

The wall of the capsule is generally made of stainless steel thus ensuring that no radioactive substances are expelled out from the capsule, whether during transport or during long-duration storage or during very long-duration warehousing.

The storage structure 20 can be transported and handled without difficulty insofar as the storage structure containing the defective rods present the same geometrical and mechanical characteristics as a fuel assembly and presents a similar weight.

Long-duration storage or very long-duration warehousing is possible inside the capsules. Given that the fission gases originally contained in the rods have escaped through the cracks in the cladding of leaky rods, the rise in pressure inside the cladding due to helium being generated over a period of about 300 years can be evaluated. The foreseeable increase in pressure is small and does not endanger the strength of the capsule. The residual power of the rods depends on the length of time they were stored in the pool prior to the rod being encapsulated; in practice, acceptable residual power levels can be obtained prior to putting leaky rods into capsules.

The temperature of leaky rods inside capsules will always be less than 400° C., with said temperature being about 200° C. during the initial years of storage when the fuel is uranium oxide $UO_2$.

The storage method of the invention can thus be used for storage over a duration of 50 to 100 years, or for warehousing over a duration of as much as 300 years, for example.

The support structure may be constituted by a transport and/or storage container having at least one location (and generally a plurality of locations) for receiving a capsule or a loading structure.

In the context of the invention, a warehousing arrangement could be used as a support structure for capsules 8 containing defective rods for very long-duration warehousing. For this purpose, the warehousing arrangement containing at least one case whose top portion is open can be placed in the fuel pool, in order to receive capsules. It is possible to fill the cases outside the pool, in a suitable installation.

After a capsule 8 has been filled by inserting a defective rod into the capsule, and then putting inert gas under pressure inside the capsule and closing the plug in leaktight manner in a loading structure such as the structure 20, and as described above, the capsule is taken in charge and placed in the or one of the cases of the warehousing arrangement.

When a case is full of capsules, it is closed.

It is possible to transport the warehousing arrangement containing the cases filled with capsules to a zone for very long-duration warehousing of leaky fuel rods inside the capsules themselves contained in the cases of the warehousing arrangement.

In any event, any dissemination of radioactive substances into the outside environment is avoided and the defective rod is packaged in such a manner as to enable it to be warehoused over a very long duration.

The warehousing structure may be designed to receive at least one loading structure as described above in the place of one (or more) cases.

The invention is not strictly limited to the implementations and embodiments described.

Thus, the capsule may be of a shape that is different from that described in detail above, and the support structure for transporting and storing capsules may present a shape that is different from the above-described "quiver", container, or warehousing arrangement.

The invention is applicable to packaging leaky rods of fuel assemblies for any type of water-cooled reactor.

The invention claimed is:

1. A method of packaging leaky fuel rods for transport and subsequent storage of at least 50 years, each leaky fuel rod containing pellets of fuel material in tubular cladding and being closed at ends of the tubular cladding and having a sealing defect, each leaky fuel rod coming from at least one fuel assembly and being deposited in a first step underwater in a pool, the method comprising:

making available a plurality of capsules, each of the plurality of capsules for receiving one of the leaky fuel rods, and each of the plurality of capsules including a tubular sheath and two end plugs, at least one of the two end plugs, comprising a top end plug and a bottom end plug being removable, each of the plurality of capsules having a longitudinal axis;

placing a loading structure in the pool, the loading structure having a plurality of locations, each location being capable of receiving one of the plurality of capsules so that the longitudinal axes of the plurality of capsules are in a vertical orientation, the loading structure having an open top end;

securing, on the open top end, a device for loading one of the leaky fuel rods into one of the at least one capsule, the device for loading having an opening and a guide device capable of being placed at the opening;

inserting the leaky fuel rods in the pool one by one into empty ones of the plurality of capsules in the loading structure at a loading location of the plurality of locations, the inserting for each leaky fuel rod including: unscrewing the top end plug of a respective capsule of the plurality of capsules; placing the leaky fuel rod into the respective capsule via the guide device; and screwing the top end plug at the top of the capsule at the top end of the capsule back into place;

moving each capsule containing the leaky fuel rod from the loading location to another location of the plurality of locations of the loading structure different from the loading location; and transporting and storing the capsules containing the leaky fuel rods.

2. The method according to claim 1, wherein the loading structure comprises a handling top nozzle and a bottom nozzle both extending transversely, the nozzles being assembled to each other by longitudinally-extending tie-bars, together with a plurality of transversely-extending spacer plates distributed in the longitudinal direction of the loading structure and each comprising an array of openings, the array of openings including first openings serving to pass and hold a respective capsule, the array of openings also including second openings having engaged therein the tie-bars, the loading structure including a first location for loading capsules in a vicinity of a corner of a square-shaped cross-section of the loading structure.

3. The method according to claim 2, wherein the loading structure further comprises a second location in which the bottom nozzle of the loading structure includes an opening for receiving a closure plug at the bottom end of the respective capsule, the location having placed therein a peg projecting into the loading structure, wherein the bottom plugs and top plugs of the capsules are pierced axially by respective channels having respective channel-closure valves located therein and urged towards a closed position by respective helical springs, an open end of the channel in the top plug including an arrangement for connection to a duct for feeding inert gas, and wherein after a leaky fuel rod has been inserted in a capsule and the top plug has been screwed back onto the capsule in the first location of the loading structure, the capsule is transferred to the second location for filling with inert gas, the bottom plug of the capsule is inserted into a corresponding housing of the bottom nozzle, so that the projecting peg lifts the valve of the bottom end plug into an open position, and an inert gas under pressure is delivered into the an inlet portion of the channel in the top end plug, so as to open the valve of the top plug and then fill the inside space of the capsule with inert gas, any water and gas contained in the capsule being expelled through the channel in the bottom end plug, the delivery of inert gas being stopped after the inside space of the capsule has been filled, so that the closure valve of the top plug recloses, with the leaky fuel rod then being stored inside the capsule in an atmosphere of inert gas under pressure.

4. A method of packaging leaky fuel rods for transport and subsequent storage of at least 50 years, each leaky fuel rod containing pellets of fuel material in tubular cladding and being closed at ends of the tubular cladding and having a sealing defect, each leaky fuel rod coming from at least one fuel assembly and being deposited in a first step underwater in a pool, the method comprising:

making available a plurality of capsules, each of the plurality of capsules for receiving one of the leaky fuel rods, and each of the plurality of capsules including a tubular sheath and two end plugs, at least one of the two end plugs, comprising a top end plug and a bottom end plug being removable, each of the plurality of capsules having a longitudinal axis;

placing a loading structure in the pool, the loading structure having a plurality of locations, each location being capable of receiving one of the plurality of capsules so that the longitudinal axes of the plurality of capsules are in a vertical orientation, the loading structure having an open top end;

securing, on the open top end, a device for loading one of the leaky fuel rods into one of the at least one capsule, the device for loading having an opening and a guide device capable of being placed at the opening;

inserting the leaky fuel rods in the pool one by one into empty ones of the plurality of capsules in the loading structure, the inserting for each leaky fuel rod including: unscrewing the top end plug of a respective capsule of the plurality of capsules; placing the leaky fuel rod into the respective capsule via the guide device; and screwing the top end plug back into place;

placing each capsule containing the leaky fuel rod in one of the locations of the loading structure; and transporting and storing the leaky fuel rods inside the capsules placed in the loading structure.

5. A method of packaging leaky fuel rods for transport and subsequent storage of at least 50 years, comprising:

depositing the leaky fuel rods in a pool;

making available a plurality of capsules, each of the plurality of capsules for receiving one of the leaky fuel rods, and each of the plurality of capsules including a tubular sheath and two end plugs, comprising a top end plug and a bottom end plug, at least one of the two end plugs being removable, each of the plurality of capsules having a longitudinal axis;

placing a loading structure in the pool, the loading structure having a plurality of locations, each location being capable of receiving one of the plurality of capsules so that the longitudinal axes of the plurality of capsules are in a vertical orientation, the loading structure having an open top end;

securing, on the open top end, a device for loading one of the leaky fuel rods into one of the at least one capsule, the device for loading having an opening and a guide device capable of being placed at the opening;

inserting the leaky fuel rods in the pool one by one into empty ones of the plurality of capsules in the loading structure at a loading location of the plurality of locations, the inserting for each leaky fuel rod including: unscrewing the top end plug of a respective capsule of the plurality of capsules; placing the leaky fuel rod into the respective capsule via the guide device; and screwing the top end plug back into place;

moving each capsule containing the leaky fuel rod from the loading location to a different storage location of the plurality of locations; and transporting and storing the leaky fuel rods inside the capsules while in the storage location.

6. The method as recited in claim 1 further comprising moving each of the capsules from the loading location to a gas filling location of the plurality of locations, and filling an inside space of the capsule with an inert gas at the gas filling location.

* * * * *